US009660758B2

(12) United States Patent
Grobe (10) Patent No.: US 9,660,758 B2
(45) Date of Patent: May 23, 2017

(54) METHOD FOR PROVIDING PROTECTION IN AN OPTICAL COMMUNICATION NETWORK AGAINST CONNECTION FAILURES

(75) Inventor: Klaus Grobe, Planegg (DE)

(73) Assignee: ADVA OPTICAL NEWTORKING SE, Meiningen OT Dreissigacker (DE)

( * ) Notice: Subject to any disclaimer, the term of this patent is extended or adjusted under 35 U.S.C. 154(b) by 355 days.

(21) Appl. No.: 13/029,095

(22) Filed: Feb. 16, 2011

(65) Prior Publication Data

US 2011/0274425 A1 Nov. 10, 2011

(30) Foreign Application Priority Data

May 7, 2010 (EP) .................................. 10162254

(51) Int. Cl.
*H04B 10/03* (2013.01)
*H04J 14/02* (2006.01)

(52) U.S. Cl.
CPC ...... *H04J 14/0283* (2013.01); *H04J 14/0212* (2013.01); *H04J 14/0291* (2013.01)

(58) Field of Classification Search
CPC . H04J 14/0212; H04J 14/0291; H04J 14/0283
(Continued)

(56) References Cited

U.S. PATENT DOCUMENTS 5,647,035 A 7/1997 Cadeddu et al.
5,999,288 A * 12/1999 Ellinas ............... H04J 14/0227
398/59

(Continued)

FOREIGN PATENT DOCUMENTS

EP 1 014 613 A2 6/2000
EP 1 075 105 A1 2/2001

OTHER PUBLICATIONS

Sakauchi et al, Wavelength Path Communication Node Apparatus, Wavelength Path Communication Control Method, Program, and Recording Medium, Dec. 3, 2009, WO2009145118.*

(Continued)

*Primary Examiner* — Ken N Vanderpuye
*Assistant Examiner* — Dibson Sanchez
(74) *Attorney, Agent, or Firm* — Jenkins, Wilson, Taylor & Hunt, P.A.

(57) ABSTRACT

The invention relates to an optical communication network (1) comprising a plurality of nodes (2) connected to each other by means of optical fibers (3) in a ring structure, wherein optical signals are transported at working wavelengths ($\lambda_w$) in a first direction in said ring structure and wherein optical signals are transported at protection wavelengths ($\lambda_p$) in a second direction that is opposite to the first direction in said ring structure, wherein for each node (2) at least one wavelength assignment table (WAT) is provided, wherein to each working wavelength ($\lambda_w$) a corresponding protection wavelength ($\lambda_p$) is assigned, wherein in case of a detected connection failure in said ring structure each node (2) which loses at least one connection performs for all working wavelengths ($\lambda_w$) affected by said connection failure a lookup in its wavelength assignment table (WAT) to determine the respective protection wavelength ($\lambda_p$) and tunes lasers of transceiver units to the determined protection wavelengths ($\lambda_p$).

11 Claims, 6 Drawing Sheets

(58) Field of Classification Search
USPC .......................................................... 398/1–8
See application file for complete search history.

(56) References Cited

U.S. PATENT DOCUMENTS

| | | | |
|---|---|---|---|
| 6,567,194 B1 | 5/2003 | Badr | |
| 7,242,860 B2* | 7/2007 | Ikeda et al. .................. | 398/5 |
| 7,293,086 B1* | 11/2007 | Duffield .............. | H04L 12/2602 709/224 |
| 7,457,244 B1* | 11/2008 | Ye ........................... | H04L 41/12 370/230 |
| 2002/0197001 A1* | 12/2002 | Hayashi ............. | H04Q 11/0005 385/17 |
| 2004/0190901 A1* | 9/2004 | Fang .................... | G02B 6/2931 398/59 |
| 2004/0267876 A1* | 12/2004 | Kakivaya ................ | H04L 67/16 709/200 |
| 2005/0286434 A1* | 12/2005 | McKee ................. | H04L 43/022 370/252 |
| 2006/0013584 A1* | 1/2006 | Miyazaki ............ | H04J 14/0227 398/19 |
| 2006/0133802 A1* | 6/2006 | Tian ..................... | H04B 10/032 398/4 |
| 2006/0133803 A1* | 6/2006 | Tian ..................... | H04B 10/032 398/4 |
| 2006/0168320 A1* | 7/2006 | Kidd ...................... | H04L 67/16 709/238 |
| 2006/0188251 A1* | 8/2006 | Chan ................... | H04J 14/0283 398/4 |
| 2007/0025729 A1* | 2/2007 | Barnard ............. | H04J 14/0204 398/5 |
| 2007/0177506 A1* | 8/2007 | Singer .................... | H04L 45/38 370/235 |
| 2007/0264011 A1 | 11/2007 | Sone et al. | |
| 2009/0059793 A1* | 3/2009 | Greenberg .......... | H04L 41/0803 370/235 |
| 2009/0180779 A1* | 7/2009 | Boduch ............... | H04J 14/0204 398/83 |
| 2011/0116790 A1* | 5/2011 | Sakauchi ............ | H04J 14/0204 398/5 |

OTHER PUBLICATIONS

Extended European Search Report for European Application No. 10162254.6 (Oct. 20, 2010).

* cited by examiner

METHOD FOR PROVIDING PROTECTION IN AN OPTICAL COMMUNICATION NETWORK AGAINST CONNECTION FAILURES

PRIORITY CLAIM

This application claims the benefit of European Patent Application No. 10162254.6 filed May 7, 2010, the disclosure of which is incorporated herein by reference.

TECHNICAL BACKGROUND

The invention provides a method for providing protection in an optical communication network against connection failures occurring in connections between nodes connected to each other by means of optical fibres in a ring structure.

Optical communication networks can connect nodes with each other by means of optical fibres in a ring structure. The ring architecture allows providing protection against line and device failures and against degradation in transmission performance. In such an optical communication network part of the transmission capacity can be dedicated to protection against failures and is therefore not normally utilized to convey data traffic. A relatively simple concept of such a ring structure is a 2-Fibre Optical-Channel Shared Protection Ring (2F-OCh-SPRing). In such a 2-Fibre bidirectional ring data traffic can travel in one direction in one fibre while data traffic in the opposite direction travels on the other fibre. In such a ring the functionality is similar to a pre-assigned restoration, but potentially faster since only the service end nodes need to perform a look-up and switch-over in case of a failure. For a large DWDM ring (Dense Wavelength Division Multiplexing) with meshed traffic pattern such a shared protection can offer increased ring capacity at comparatively low costs.

In U.S. Pat. No. 5,647,035 a ring network communication structure on an optical carrier and a reconfigurable node is described. A plurality of nodes is interconnected by means of connections that include at least a first and a second optical carrier such as an optical fibre. The transmission between the nodes occurs according to a WDM scheme utilizing a first wavelength for communication in one direction on a first carrier and a second wavelength for communication in the opposite direction on a second carrier. The second wavelength on the first carrier and the first wavelength on the second carrier are reserved for protection (protection channels). When a failure occurs on one of the connections nodes adjacent to the failed connection a node can reconfigure itself to ensure a continuation of the data communication on an alternative path of the ring, by utilizing the first wavelength on the second carrier and the second wavelength on the first carrier. In this conventional ring network multi-wavelength signals have to be managed since signal rerouting is localized at the nodes adjacent to the failure. The protection operations have to be performed on the entire set of wavelength of the multiplex section and the reconfigured nodes of the network must reroute all working channels that were previously sent on the damaged ring segment to their respective protection channels running onto the complementary ring arc. Consequently each node of this conventional network has to be equipped with optical switching tools for the complete set of wavelengths in the ring and a switch matrix is needed with a complexity which increases considerably with the increasing number of communication channels. Each client device needs for each logical traffic connection a transceiver/receiver pair and a corresponding switching matrix thus increasing the complexity significantly.

EP 1 075 105 A1 describes an autoprotected optical communication ring network having a first optical carrier configured to transport optical signals in a first direction and a second optical carrier configured to transport optical signals in a second direction that is opposite to the first direction. The plurality of nodes is connected along the first optical carrier and the second optical carrier to form bidirectional links. During a failure condition optical signals using a first wavelength on the second optical carrier and the second wavelength to the first optical carrier are exchanged. The rerouting operation is performed at the nodes that terminate the affected links only on the failed channels. However, each node of this optical communication network comprises a receiving/transmitting module consisting of a matrix arrangement of optical switches having a high complexity. The network of EP 1 075 105 A1 employs special switch matrias provided in the nodes which is therefore comprise a high technical complexity and are difficult to implement. Furthermore, this conventional network is not flexible.

Accordingly, it is an object of the present invention to provide a method far providing protection in an optical communication network against connection failures which can be implemented with a relative low technical complexity and which is flexible to changes in the network topology.

SUMMARY OF THE INVENTION

The invention provides an optical communication network comprising a plurality of nodes connected to each other by means of optical fibres in a ring structure, wherein optical signals are transported at working wavelengths in a first direction in said ring structure and wherein optical signals are transported at protection wavelengths in a second direction that is opposite to the first direction in said ring structure, wherein for each node at least one wavelength assignment table is provided and wherein to each working wavelength a corresponding protection wavelength is assigned, wherein in case of a detected connection failure in the ring structure each node which loses at least one connection performs for all working wavelengths affected by said connection failure a lookup in its wavelength assignment table to determine the respective protection wavelength and tunes lasers of transceiver units to the determined protection wavelengths.

In a possible embodiment of the optical communication network according to the present invention for each node a first wavelength assignment table is provided for connection failures caused by fibre breaks and a second wavelength assignment table is provided for connection failures caused by client port transceivers.

In a possible embodiment of the optical communication network according to the present invention each node comprises a memory which stores the at least one wavelength assignment table.

In a possible embodiment each node receives the at least one wavelength assignment table from a master node of the optical communication network via a data communication network (DCN).

In a possible embodiment the node receives the at least one wavelength assignment table WAT from the master node by means of an embedded communication channel ECC.

In an alternative embodiment each node receives the at least one wavelength assignment table WAT from the master node by means of an optical supervisory channel OSC.

In a possible embodiment of the optical communication network according to the present invention each node comprises a control unit for controlling at least one colorless reconfigurable optical add/drop multiplexer (CL-ROADM) connecting the node to the ring structure.

In a possible embodiment of the optical communication network according to the present invention the colorless reconfigurable optical add/drop multiplexer is a directionless (DL) colorless reconfigurable optical add/drop multiplexer (DL-CL-ROADM).

In a possible embodiment of the optical communication network according to the present invention the at least one wavelength assignment table WAT is derived automatically from a traffic matrix TM indicating logical data connections of client ports in the optical communication network.

In a possible embodiment of the optical communication network according to the present invention the traffic matrix is generated by a master node of said optical communication network in a service discovery.

In a possible embodiment of the optical communication network according to the present invention the transceiver unit provided at a client port comprises a working tunable transceiver, WT, having a tunable working laser generating an optical signal at a working wavelength transported in the ring structure in the first direction and a protection tunable transceiver, PT, having a tunable protection laser generating an optical signal at a protection wavelength transported in the ring structure in the second direction.

In a possible embodiment of the optical communication network according to the present invention the transceiver unit provided at a client port comprises a single tunable transceiver having a tunable laser generating an optical signal at a working wavelength or at a corresponding protection wavelength, wherein both optical signals are transported in opposite directions within said ring structure of said optical communication network.

In a possible embodiment of the optical communication network according to the present invention the client port comprises a port of a network switch, a port of a network router or a port of a network terminal.

In a possible embodiment of the optical communication network according to the present invention in a normal operation mode of the optical communication network for each protection wavelength at least one colorless reconfigurable optical add/drop multiplexer is adapted to block the optical signal for the respective protection wavelength to avoid a closed loop.

In a possible embodiment of the optical communication network according to the present invention after detection of a connection failure in a protection operation mode for all determined protection wavelengths blocking of optical signals at the respective protection wavelength is terminated.

In a possible embodiment of the optical communication network according to the present invention the optical communication network comprises an optical channel shared protection ring (OCH-SPR).

In a possible embodiment of the optical communication network according to the present invention the nodes are connected by spans each comprising at least two optical fibres.

The invention further provides a method for providing protection in an optical communication against connection failures comprising the features of claim 15.

The invention provides a method for providing protection in an optical communication network against connection failures of connections between nodes connected to each other by means of optical fibres in a ring structure, wherein optical signals are transported at working wavelengths in a first direction in the ring structure and wherein optical signals are transported at protection wavelengths in a second direction that is opposite to the first direction in the ring structure, wherein for each node at least one wavelength table WAT is provided in which to each working wavelength a corresponding protection wavelength is assigned, wherein in case of a detected connection failure in the ring structure each node which loses at least one connection performs for all working wavelengths affected by the connection failure a lookup in its wavelength assignment table to determine the respective protection wavelength and tunes lasers of transceiver units to the determined protection wavelengths.

In the following possible embodiments of the optical communication network and the method for providing protection in an optical communication network are described with reference to the enclosed figures.

DETAILED DESCRIPTION OF EMBODIMENTS

Figure 1:
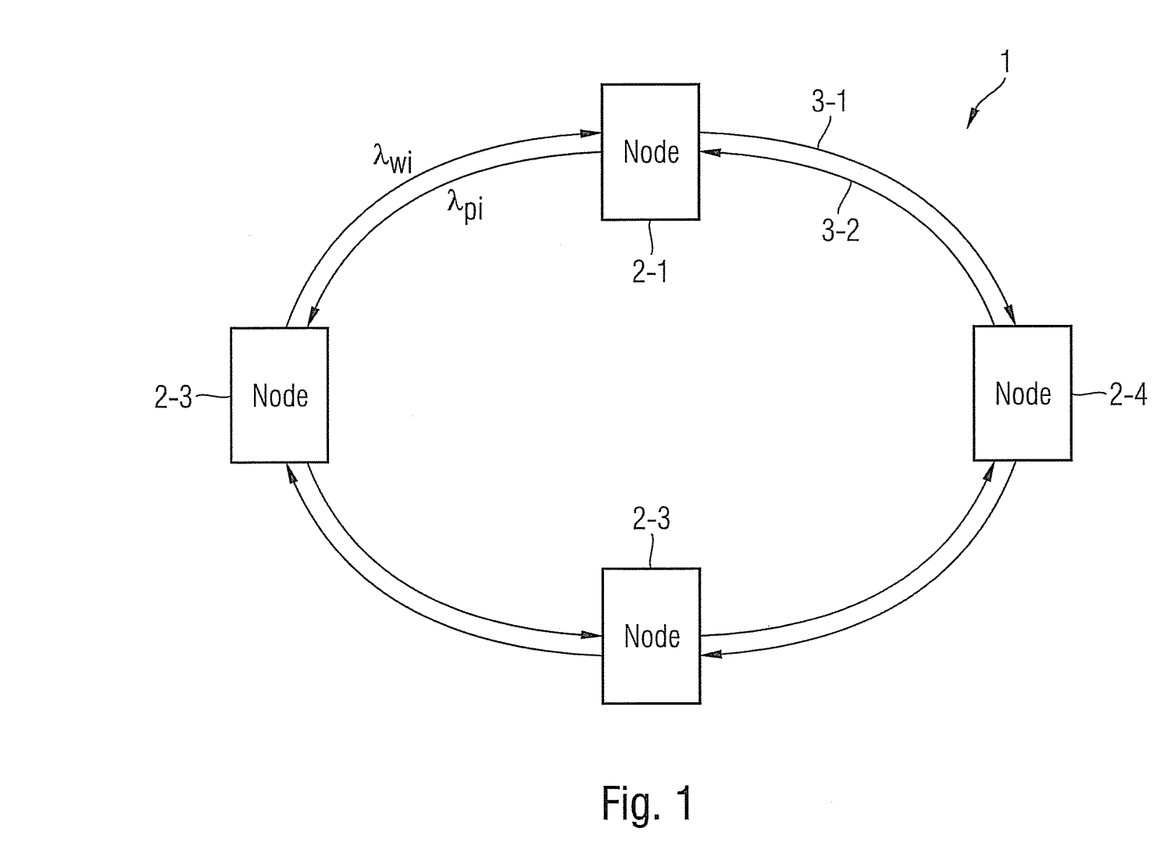
FIG. 1 shows a diagram for illustrating a structure of an optical communication network according to a possible embodiment of the present invention.

As can be seen from FIG. 1 an optical communication network 1 according to the present invention can comprise a plurality of nodes 2 connected to each other by means of optical fibres 3 in a ring structure. In the shown exemplary embodiment four nodes 2-1, 2-2, 2-3, 2-4 are connected to each other by a pair of optical fibres 3-1, 3-2. In this optical communication network 1 optical signals are transported at working wavelength $\lambda_w$ in a first direction in the ring structure. In the shown embodiment optical signals are transported at working wavelength $\lambda_w$ in a first direction within an optical fibre 3-1. Further optical signals are transported at protection wavelength $\lambda_p$ in a second direction that is opposite to the first direction in the ring structure. In the exemplary embodiment shown in FIG. 1 the optical signals are transported at protection wavelength $\lambda_p$ in a second direction in a second optical fibre 3-2. In the exemplary embodiment shown in FIG. 1 the optical signals transported at working wavelength $\lambda_w$ are transported clockwise in the ring on the first optical fibre 3-1 and the optical signals transported at protection wavelength $\lambda_p$ are transported counter clockwise in the ring structure on the second optical fibre 3-2. In the embodiment shown in FIG. 1 four nodes 2-1 to 2-4 are connected in the optical ring structure. The number of nodes 2-I can vary in the ring structure. The nodes 2-I are connected to each other by fibre spans which can be separated from each other by a long distance, e.g. more than 5 km, for example 100 km. The number of working wavelengths $\lambda_w$ provided on a fibre 3-$i$ can also vary and can comprise more than 20 working wavelength $\lambda_w$. In another embodiment the number of working wavelength $\lambda_w$ is 40. In a further possible embodiment the number of working wavelength $\lambda_w$ is 80. In a possible embodiment to each working wavelength $\lambda_w$ a corresponding protection wavelength $\lambda_p$ can be assigned.

In the optical communication network 1 according to the present invention for each node 2-$i$ at least one wavelength assignment table WAT is provided which can be stored in an integrated memory of the node 2-$i$. In this wavelength assignment table WAT for each working wavelength $\lambda_w$ a corresponding protection wavelength $\lambda_p$ is assigned. In case of a detected connection failure in the ring structure of the optical communication network 1 each node 2-$i$ which loses at least one connection performs for all working wavelengths $\lambda_w$ affected by the detected connection failure a lookup in its wavelength assignment table WAT to determine the respective protection wavelengths $\lambda_p$. After having determined the respective protection wavelengths $\lambda_p$ it tunes the lasers of transceiver units to the determined protection wavelengths $\lambda_p$. In the optical communication network 1 according to the present invention each node 2 comprises a memory which stores at least one wavelength assignment table WAT. In a possible embodiment a first wavelength assignment table WAT-A is provided for connection failures caused by fibre breaks in optical fibres 3-$i$ within the ring structure. In a possible embodiment 2-I each node further comprises a second wavelength assignment table WAT-B which is provided for connection failures caused by client port transceivers.

In one embodiment of the optical communication network 1 according to the present invention each node 2 receives the at least one wavelength assignment table WAT from a master node of the optical communication network. This master node can be a predetermined node 2-$i$ of the network 1. In a possible embodiment the other nodes 2-I of the network 1 receive the respective wavelength assignment table WAT from the dedicated or predetermined master node of the optical communication network 1 via a data communication network DCN. This can be performed in a possible embodiment by means of an embedded communication channel ECC. In an alternative embodiment this can be performed by means of an optical supervisory channel OSC. In the optical communication network 1 according to the present invention the protection channels running the other way around in the bidirectional 2-Fibre optical network ring. Under normal working conditions these protection channels are not added to or dropped from respective optical multiplex sections OMS forming the spans between the nodes 2-$i$. For each working wavelength $\lambda_w$ one protection wavelength $\lambda_p$ is reserved and a corresponding optical signal runs the other way around in the optical network ring. Hence, any span failure can be fully protected. One protection wavelength $\lambda_p$ can protect several working connections $\lambda_w$ given a corresponding traffic pattern thus providing a positive sharing effect. In case of span failures or fibre breaks lasers of transceiver units are tuned to pre-assigned protection wavelengths. This can be done by a central ring sub-network management NMS or by a control plane CP using suitable signaling and routing protocol extensions. In both cases assignment can start in any particular span such as span 1 between node 2-1 and node 2-2. A first service or logical data connection at a working wavelength $\lambda_w$ can be assigned to a protection wavelength $\lambda_p 1$. A second service can be assigned to a second protection wavelength $\lambda_p$ etc. Any services in the next span or optical multiplex section OMS which are still unprotected are assigned AO the next free protection wavelength $\lambda_p$ etc. In a possible embodiment this assignment is static, i.e. valid as long as the traffic pattern in the network ring is static. A complete wavelength assignment list or wavelength assignment table WAT can in a possible embodiment be distributed to all nodes 2-$i$ in the ring structure.

In a possible embodiment the wavelength assignment table WAT can be derived automatically from a traffic matrix TM indicating logical data connections of client ports in the optical communication network 1. In a possible embodiment this traffic matrix TM is generated by a master node of the optical communication network 1 in a service discovery. In a possible embodiment each node 2-$i$ within the communication network 1 receives the generated wavelength assignment table WAT from the master node of the optical communication network. This can be done via a data communication network DCN by means of an embedded communication channel ECC or by means of an optical supervisory channel OSC. In case that a failure is detected those nodes in the network 1 which lose connections perform a lookup to determine the respective protection wavelength $\lambda_p$. The corresponding lasers are tuned to these wavelengths and powered up. In a possible embodiment the lasers are not switched off completely but are powered up from a low power mode.

In a preferred embodiment of the optical communication network 1 according to the present invention each node 2 comprises a control unit for controlling at least one colorless reconfigurable optical add/drop multiplexer CL-ROADM connecting the node 2 to the ringstructure of the optical communication network 1. In a preferred embodiment this colorless CL reconfigurable optical add/drop multiplexer CL-ROADM is a directionless colorless reconfigurable optical add/drop multiplexer DL-CL-ROADM. In the data communication network 1 according to the present invention all client signals are connected to uncolored or colorless add/drop ports of the reconfigurable optical add/drop multiplexer ROADM. In case of a span failure corresponding lasers are tuned to the protection wavelength $\lambda_p$ and powered up. After this the respective colorless add/drop ports of the reconfigurable add/drop multiplexer ROADM are connected to the OMS (optical multiplex section) ports. To some extend multiple span failures are protected as well. For example if two adjacent spans fail in the network the data traffic from or to the isolated node gets lost. In a possible embodiment additional wavelength assignments are provided to provide protection against multiple failures wherein additional wavelength assignments can be done after the first failure has occurred. In a possible embodiment the method according to the present invention does not only provide protection against fibre break of optical fibres in the network 1 but also against failures caused by client port transceivers. In this embodiment not only one wavelength assignment table WAT is provided for connection failures caused by fibre breaks but also a second wavelength assignment table is provided for connection failures caused by client port transceivers.

In a possible embodiment of the optical communication network 1 according to the present invention each node 2-I which loses at least one connection performs a lookup in its wavelength assignment table WAT to determine the respective protection wavelength $\lambda_p$ and tunes lasers of transceiver units to the determined protection wavelength. The transceiver unit is provided at a client port for a client device which can be connected to the node 2-$i$ of the network 1. This client port transceiver unit comprises in a first possible embodiment a working tunable transceiver WT and a protection tunable transceiver PT. The working tunable WT transceiver has a tunable working laser generating an optical signal at a working wavelength $\lambda_w$ transported in the ring structure in the first direction. The protection tunable transceiver PT has a tunable protection laser generating an optical signal at a protection wavelength $\lambda_p$ transported in the ring structure in the second opposite direction.

In an alternative embodiment each transceiver unit provided at the client port comprises a single tunable transceiver. This single tunable transceiver has a tunable laser generating an optical signal at a working wavelength $\lambda_w$ or at a corresponding protection wavelength $\lambda_p$. In this embodiment both optical signals are transported in opposite directions in the ring structure of the optical communication network 1. Each node 2-$i$ of the optical network 1 can have one or several client ports. The client port can be a port for a network switch, a port for a network router or a port for a network terminal.

As can be seen from FIG. 1 the optical communication network according to the present invention comprises an Optical-Channel Shared Protection Ring OCh-SPR ring wherein nodes 2-$i$ are connected by spans each comprising at least two optical fibres 3-1; 3-2.

In a possible embodiment in a normal operation mode of the optical communication network 1 at each protection wavelength $\lambda_p$ at least one colorless reconfigurable optical add/drop multiplexer CL-ROADM is adapted to block the optical signal for the respective protection wavelength $\lambda_p$ to avoid a closed loop. After detection of a connection failure in a protection operation mode for all determined protection wavelength $\lambda_p$ the blocking of optical signals at the respective protection wavelength $\lambda_p$ is terminated or lifted. In the embodiment shown in FIG. 1 the optical communication network 1 according to the present invention is based on a bidirectional 2-Fibre (2F) WDM ring and quasi standard components, i.e. colorless ROADMs as well as tunable interfaces or lasers. The ring can comprise a meshed traffic pattern with a high data traffic load between neighboring nodes. For all working traffic in the intact ring wavelengths are used wherever possible thus providing a sharing effect which increases total ring capacity. For every working wavelength $\lambda_w$ one protection wavelength $\lambda_p$ can be reserved running the other way around in the ring. Consequently any span failure between nodes 2-I can be fully protected.

Figure 2A:
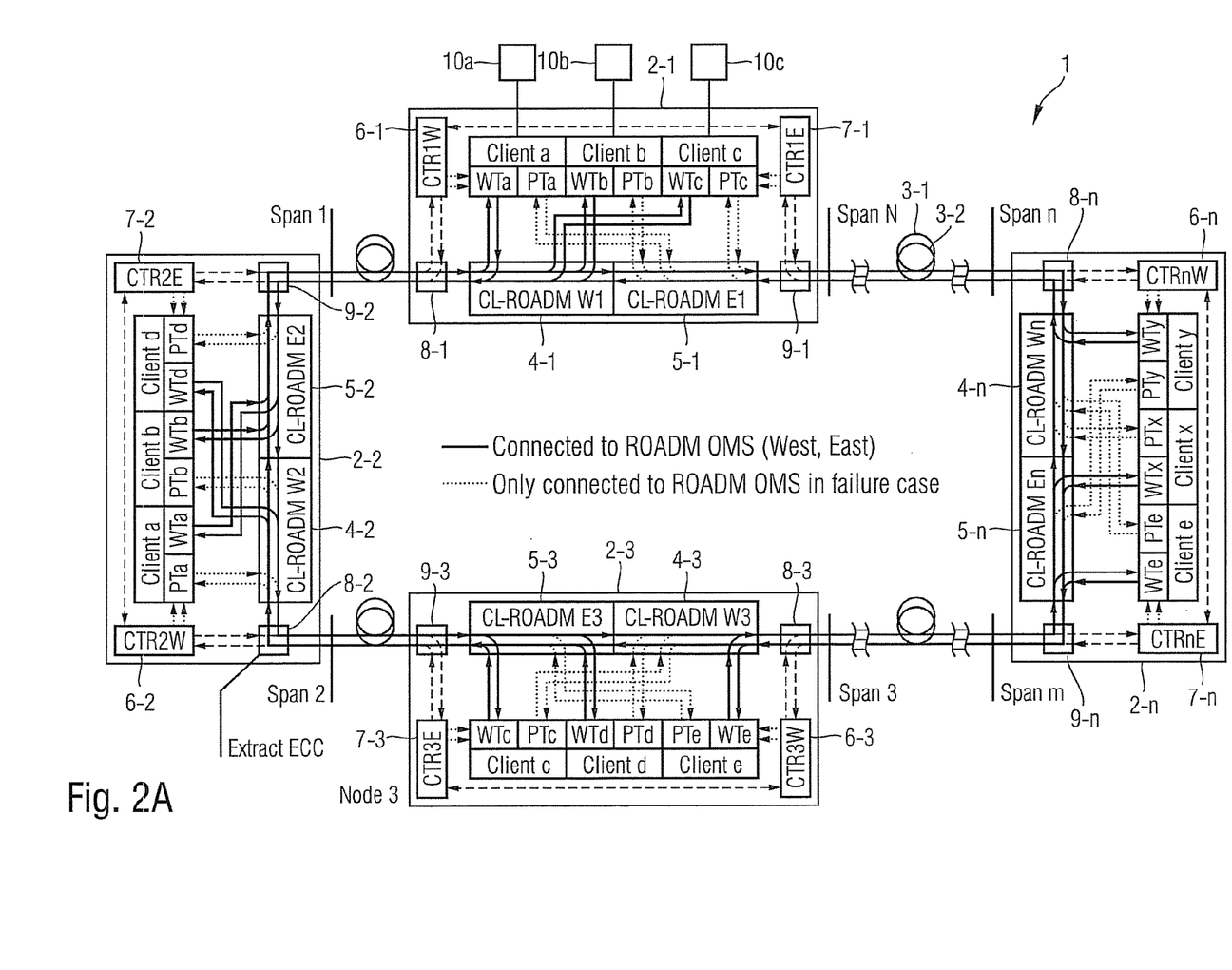
FIGS. 2A, B, C show diagrams for illustrating possible embodiments of an optical communication network according to the present invention.
Figure 2B:
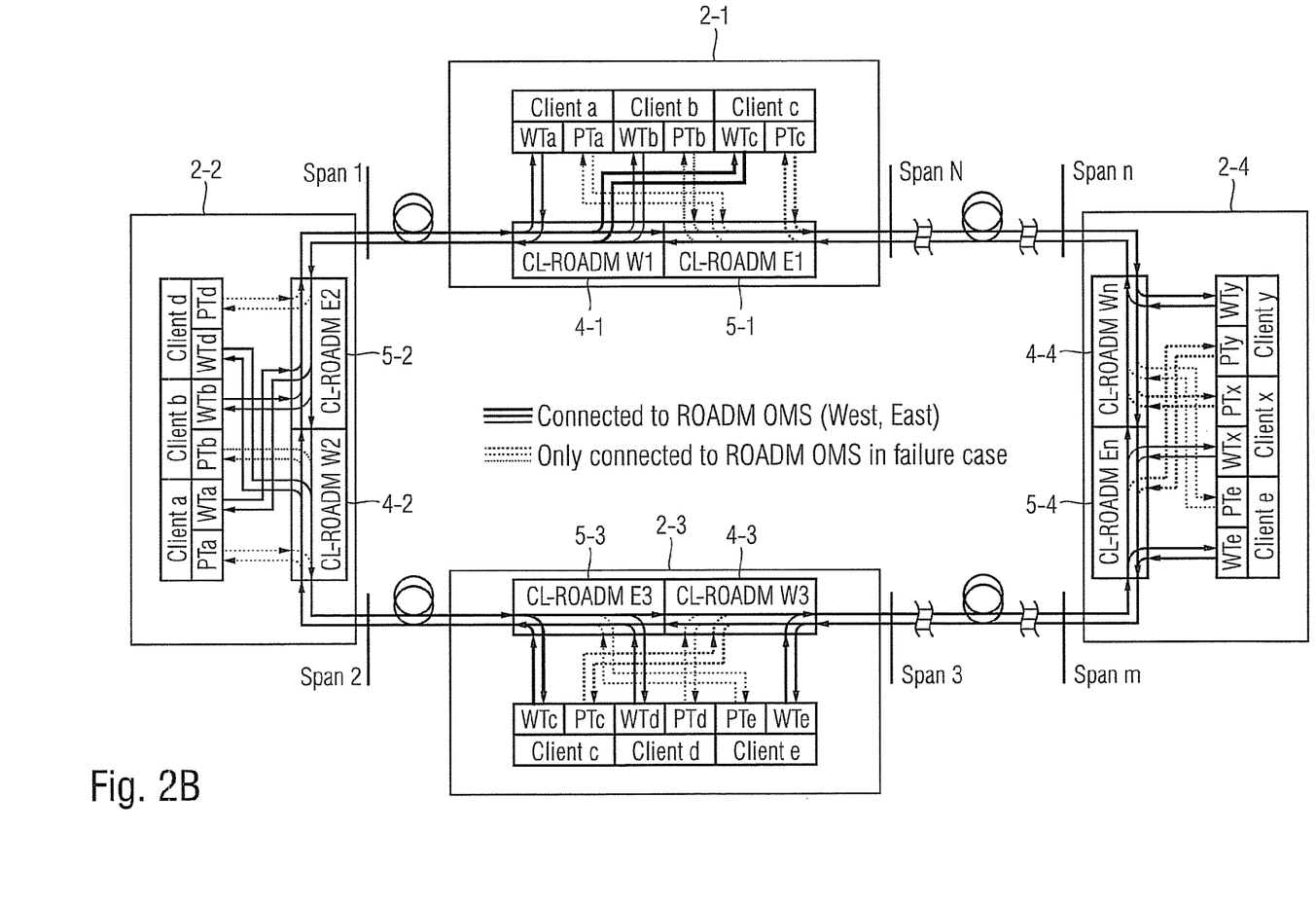
Figure 2C:
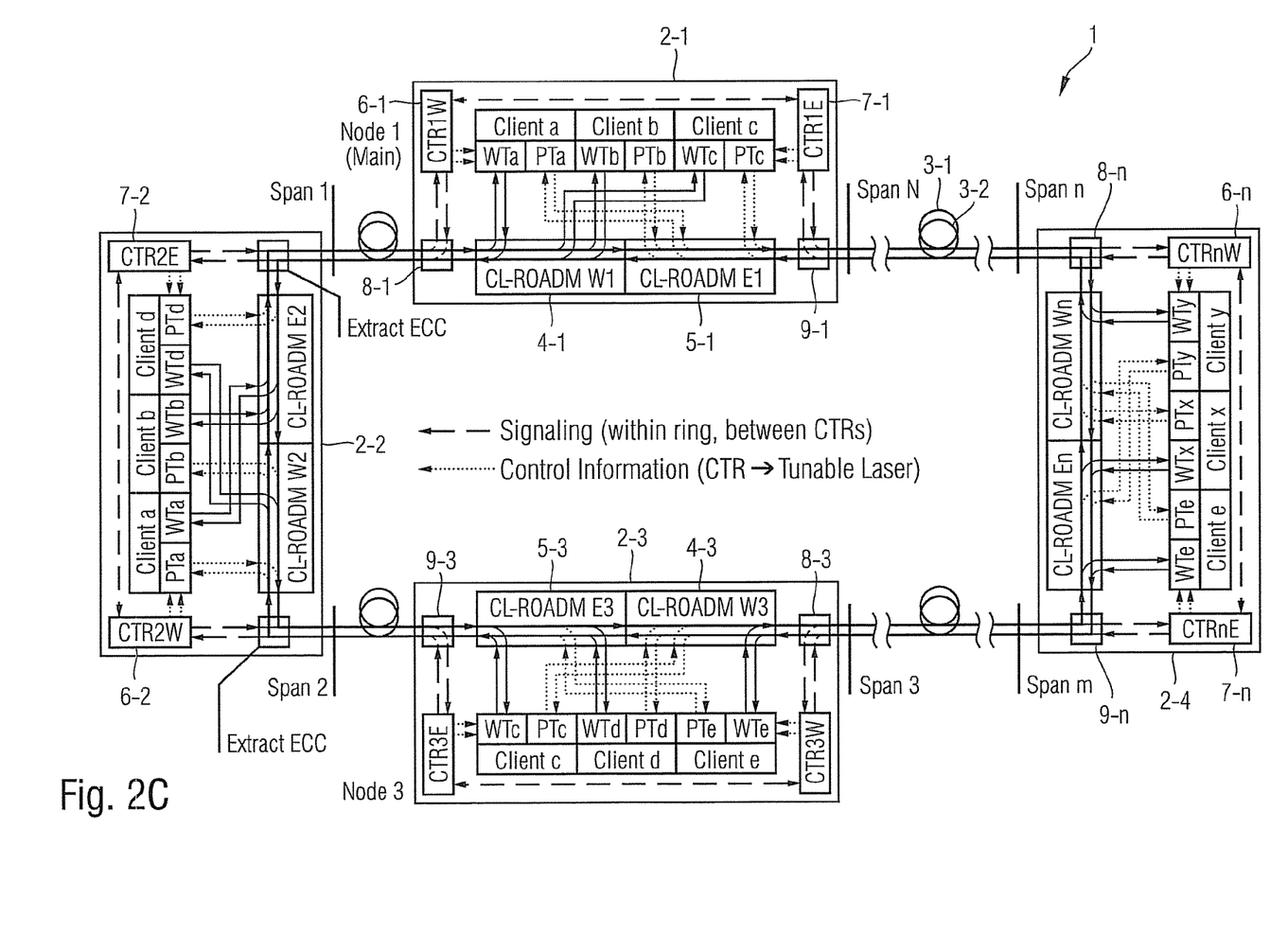

Figs. 2A, 2B, 2C illustrate possible embodiments of an optical communication network 1 according to the present invention. In the shown embodiment N=4 nodes 2-$i$ are connected to each other in a ring structure. In the shown embodiment the ring structure comprises two fibres 3-1, 3-2 connecting the nodes 2-$i$ to each other. As can be seen in FIG. 2A, 2B, 2C each node 2-$i$ comprises two colorless (CL) reconfigurable optical add/drop multiplexer (ROADM) one being provided for the left neighboring node (West connection W) the other being provided for the right neighboring node (eastern connection E). As can be seen in FIG. 2A the first node 2-1 within the communication network 1 comprises a first colorless (CL) ROADM 4-1 and a second colorless-ROADM 5-1. Furthermore node 2-1 comprises a first control unit 6-1 and a second control unit 7-1. Both control units 6-1, 7-1 can be integrated. The control units 6-1, 7-1 are connected to multiplexing/demultiplexing devices 8-1, 9-1 respectively. These multiplexing/demultiplexing devices 8-1, 9-1 allow to setup a communication path or a data communication channel DCN with the next neighboring node in the ring. Within the data communication network DCN channel control information can be exchanged between the nodes 2-$i$ of the data communication network 1. In the shown embodiment of FIG. 2A each node 2-$i$ comprises three client ports a, b, c for connecting client devices 10 to the respective network node 2. In the exemplary embodiment shown in FIG. 2A a client device 10$a$ is connected to the client port a of the network node 2-1. For each client port a client port transceiver unit is provided. In the shown exemplary embodiment of FIG. 2A the node 2-1 comprises for each client port a, b, c a client port transceiver. In the shown embodiment the client port transceiver comprises a working tunable transceiver WT and a protection tunable transceiver PT. The working tunable transceiver WT has a tunable working laser generating an optical signal at a working wavelength $\lambda_w$ transported in the ring structure in a first direction. The corresponding protection tunable transceiver PT has a tunable protection laser generating an optical signal at a protection wavelength $\lambda_p$ transported in the ring structure in the second opposite direction. As indicated in FIG. 2A the working tunable transceiver WT is connected to the ROADM OMS (west, east). The protection tunable transceiver PT is connected to the ROADM OMS only in a failure case.

In the embodiment as shown in FIGS. 2A, 2B, 2C each client port comprises a client port transceiver unit consisting of a working tunable transceiver WT and a protection tunable transceiver PT.

In an alternative embodiment each client port comprises a client port transceiver unit which comprises a single tunable transceiver having a tunable laser generating an optical signal at a working wavelength $\lambda_w$ or at a corresponding protection wavelength $\lambda_p$, wherein both optical signals are transported in opposite directions within the ring structure of the optical communication network 1.

In the embodiment as shown in FIG. 2A the network devices 10$a$, 10$b$, 10$c$ are connected to the client ports a, b, c of the first communication network node 2-1. These network devices 10$a$, 10$b$, 10$c$ can comprise network switches, network routers or network terminals.

The node 2-1 comprises control units 6-1, 7-1 for controlling the colorless reconfigurable optical add/drop multiplexers 4-1, 5-1 connecting the node to the ring structure of the communication network 1. Both control units 6-1, 7-1 of node 2-1 can be integrated in one control unit. In a possible embodiment as data memory is provided in the control unit 6-1, 7-1 for storing the at least one wavelength assignment table WAT. In this data memory a first wavelength assignment table WAT-A can be stored wherein this first wavelength assignment table WAT-A is provided for connection failures caused by fibre breaks of the optical fibres 3-1, 3-2. Furthermore, in this data memory of the control unit 6-1, 6-2 a second wavelength assignment table WAT-B can be provided for connection failures caused by client port transceivers. In a possible embodiment these wavelength assignment tables WAT are received by the respective node 2-$i$ from a master node the optical communication network 1 via a data communication channel DCN. In a possible embodiment of the master node can be formed by any node within the network 1 such as node 2-$n$ deriving at least one wavelength assignment table WAT from a traffic matrix TM indicating logical data connections of client ports in the optical communication network 1. This traffic matrix TM can be generated by the master node in the optical communication network 1 for example in a service discovery.

Figure 3A:
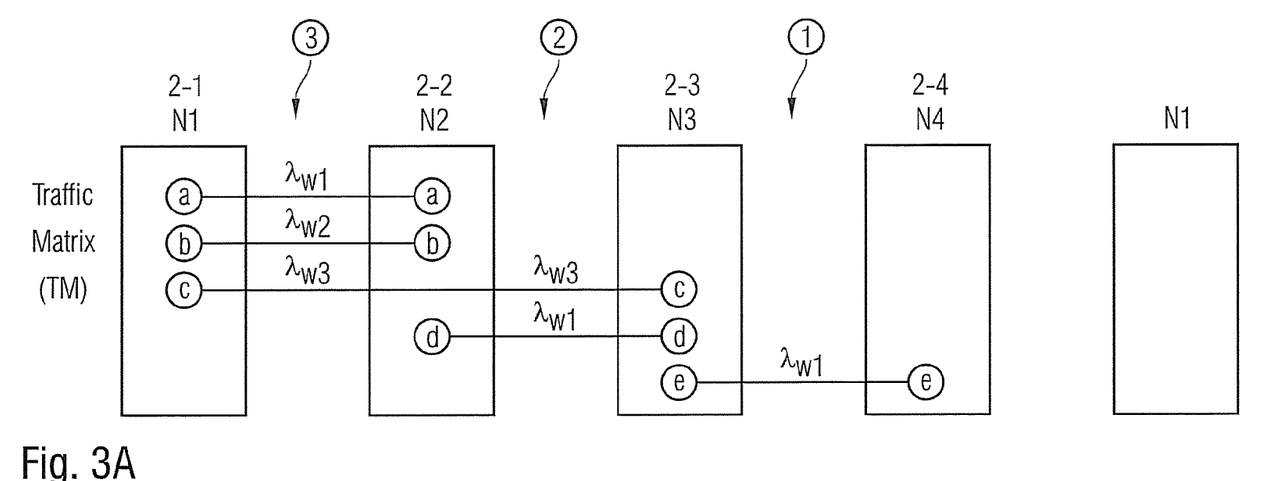
FIG. 3A, B show an exemplary traffic matrix and an exemplary wavelength assignment table to illustrate a method for providing protection in an optical communication network according to the present invention.
Figure 3B:
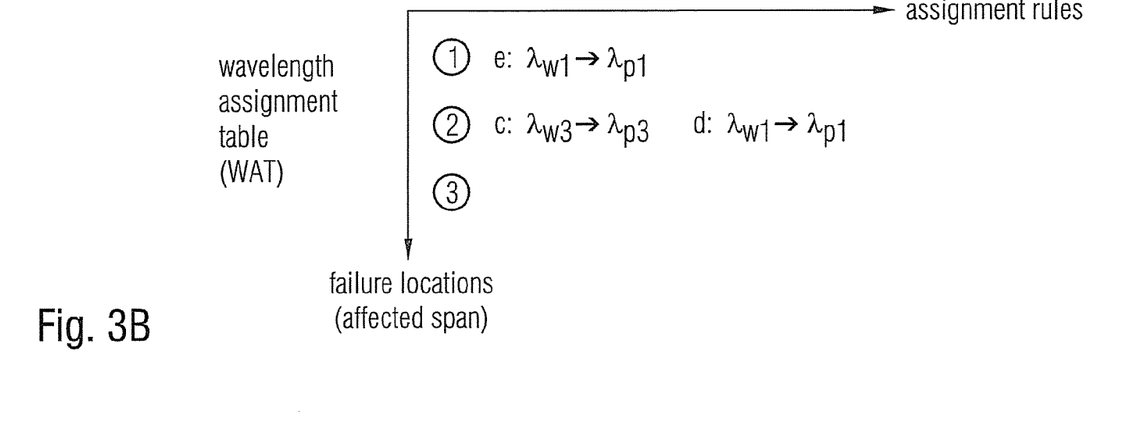

FIGS. 3A, 3B show an example how a wavelength assignment table WAT is derived from a traffic matrix TM in the network 1. The traffic matrix TM shows logical data connections of client ports such as client ports a, b, c, d, e in the optical communication network 1. In the given example of FIG. 3A client port a of node 2-1 has a logical data connection to client port a of node 2-2 wherein data is transported on working wavelength $\lambda_w 1$. Furthermore, client port b of node 2-2 comprises a logical data connection to client port b of node 2-2 and data is transported between both client ports on a working wavelength $\lambda_w 2$. Furthermore, client port c of node 2-1 is connected to client, port c of node 2-3 via node 2-2 and data is transported on working wavelength $\lambda_w 3$. Client port d within node 2-2 is connected to client port d of node 2-3 transporting data on working wavelength $\lambda_w 1$. The third client port e of node 2-3 is connected to client port e of node 2-4 transporting data also on a working wavelength $\lambda_w 1$.

Fig. 3B shows an example of a corresponding wavelength assignment table WAT derived from the traffic matrix TM shown in FIG. 3A. The wavelength assignment table WAT indicates for different failure locations corresponding assignment rules for each client. In the given example failure 1 separates or breaks the span between node 2-3 and 2-4, i.e. the logical data connection e. For example, a fibre 3-I of the span between node 2-3 and 2-4 is interrupted each node which loses a connection, i.e. nodes 2-3 and 2-4, performs a lookup in its wavelength assignment table WAT. It determines the respective protection wavelength $\lambda_p$, i.e. in this case protection wavelength $\lambda_p 1$. Then the lasers of the transceiver units in these nodes are tuned to the determined protection wavelength $\lambda_p 1$ In the given example of FIGS. 3A, 3B if there is a connection failure 2 between nodes 2-2, 2-3 the lasers are tuned from working wavelength $\lambda_w 3$ to protection wavelength $\lambda_p 3$ and from working wavelength $\lambda_w 1$ to protection wavelength $\lambda_p 1$. As can be seen a shared protection is offered. In a possible embodiment the wavelength assignment table WAT such as shown in FIG. 3B is updated whenever the traffic matrix TM as shown in FIG. 3A is changed. The traffic matrix TM can for example be updated or changed if a client device 10 is added or removed from a node 2-i of the optical communication network 1. If the traffic matrix TM is changed the master node calculates in a possible embodiment automatically updated the wavelength assignment table WAT and distributes the updated wavelength assignment table WAT to all nodes 2-I in the network 1. The distribution of the updated wavelength assignment table WAT can be performed via the DCN, e.g. IP-based.

In an alternative embodiment the changed traffic matrix TM is distributed and the update of the wavelength assignment table WAT is performed locally at the respective node 2-i within the network 1. In a possible embodiment after installation of the optical communication ring the master node performs a topology discovery of the network to generate a topology table. Then a service discovery is performed to generate the traffic matrix TM as shown for instance in FIG. 3A. Finally, the master node derives a wavelength assignment table WAT as shown in FIG. 3B from the generated traffic matrix.

Figure 4:
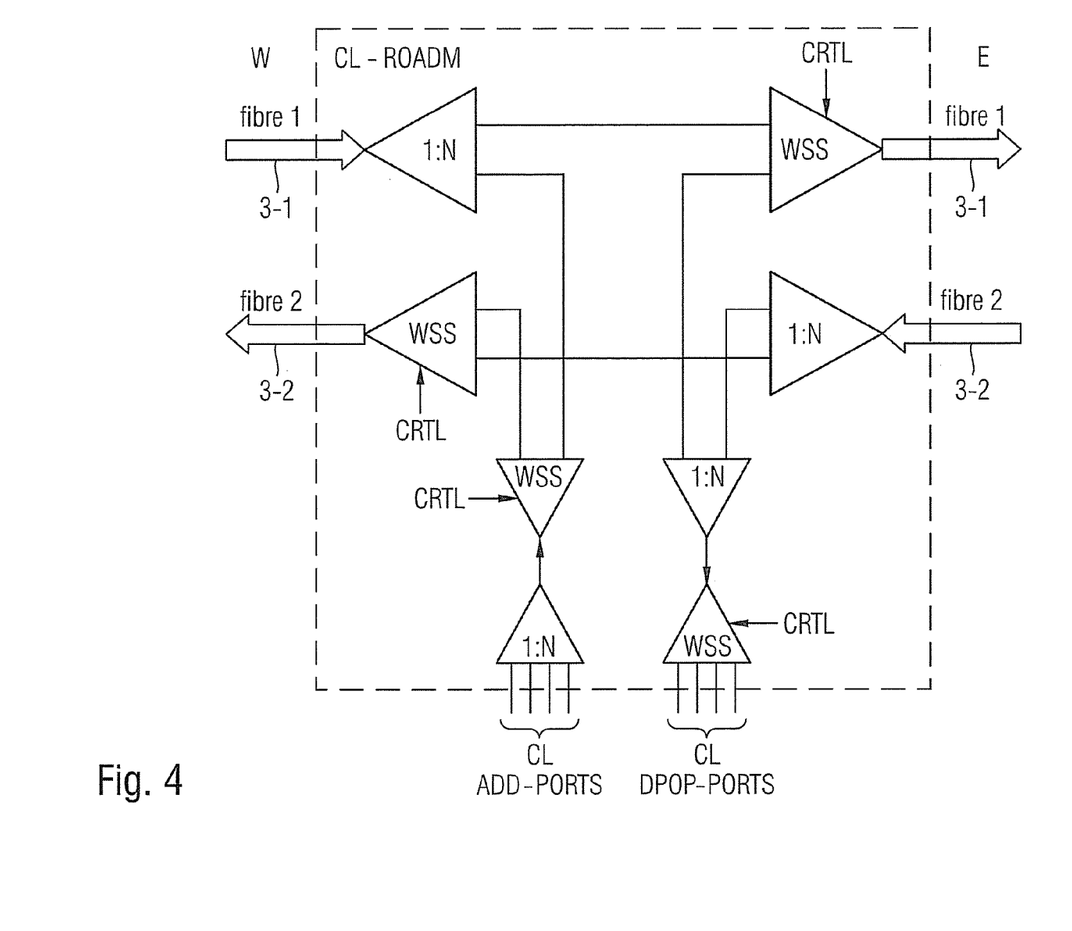
FIG. 4 shows a diagram of a possible embodiment of a reconfigurable optical add/drop multiplexer as employed by the optical communication network in a possible embodiment of the present invention.

FIG. 4 shows an exemplary embodiment of a colorless ROADM (CL-ROADM) 4-i, 5-i as employed by the optical communication network 1 according to the present invention. As can be seen the CL-ROADM comprises colorless (CL) add ports corresponding to the client ports and colorless (CL) drop ports. The CL-ROADM in a possible embodiment as shown in FIG. 4 can comprise wavelength selective switches WSS controlled by a control signal CRTL and passive splitters and combiners. The re-configurable optical add/drop multiplexer ROADM derives an ability to switch traffic from a WDM system in a wavelength layer. It is possible to add or drop data channels which carry one or multiple wavelengths on a transport fibre 3-i without the need to convert the signals for all WDM channels. The CL-ROADM allows for a remote configuration and reconfiguration. Furthermore, the CL-ROADM can comprise an automatic power balancing. Switching or reconfiguration of the ROADM as shown in FIG. 4 can be achieved by a variety of switching technologies comprising MEMS, liquid crystal, thermo-optic and beam steering switches in planar waveguard circuits as well as tunable optical filter technology. In a possible embodiment the CL-ROADM connect the nodes 2-i in a closed optical ring forming a DWDM optical ring.

Under normal working conditions all protection wavelengths $\lambda_p$ are blocked in at least one ROADM within the ring. This is to avoid a closed loop. Accordingly in a normal operation mode in the optical communication network 1 according to the present invention for each protection wavelength $\lambda_p$ at least one colorless reconfigurable optical add/drop multiplexer CL-ROADM is adapted to block the optical signal for the respective protection wavelength $\lambda_p$ to avoid a closed loop. Only after detection of a connection failure in a protection operation mode of the network 1 for all determined protection wavelengths $\lambda_p$ the blocking of optical signals at the respective protection wavelength $\lambda_p$ is terminated. Not only affected ROADMs perform the lookup but also a dedicated centralized entity or master node can be provided Ao lift to the respective wavelength blocking. This can be done in a possible embodiment by a centralized monitoring and management. In an alternative embodiment this is performed decentralized triggered by the affected ROADMS. Protection then can be seen as shifting the wavelength blocking to one of the affected end nodes 2-i. The provision of colorless (CL) reconfigurable optical add/drop multiplexer (ROADM) and tunable lasers and transceiver units allows to provide nodes 2-i not having complex switch matrices and WDM filters. There is no loop back in case of a protection event and the end nodes perform the switchover offering a shared protection. The optical communication network 1 according to the present invention allows for combined shared ring protection and dedicated client I/F and ring protection. In the same ring also unprotected client layer protected services are possible. In a possible embodiment the working tunable transceivers WT and the protection tunable transceivers PT can also be pluggable devices.

The invention claimed is:
1. An optical communication network comprising:
a plurality of nodes connected to each other by means of optical fibres in a ring structure and client ports comprising a client port transceiver unit,
the client port transceiver unit comprising:
a working tunable transceiver having a tunable working laser generating an optical signal at a working wavelength transported in said ring structure in a first direction,
wherein said working tunable transceiver is connected to an optical multiplex section of a reconfigurable optical add/drop multiplexer, and a protection tunable transceiver having a tunable protection laser generating an optical signal at a protection wavelength transported in said ring structure in a second direction, wherein said second direction is opposite to the first direction in said ring structure, wherein for each node at least two wavelength assignment tables are provided, a first wavelength assignment table is provided for connection failures caused by fibre breaks and a second wavelength assignment table is provided for connection failures caused by client port transceiver units, wherein to each working wavelength a corresponding protection wavelength is assigned, wherein in case of a detected connection failure in said ring structure each node which loses at least one connection performs for all working wavelengths affected by said connection failure a lookup in its wavelength assignment tables to determine a respective protection wavelength and tunes the tunable protection laser of the client port transceiver unit to the determined protection wavelength, wherein said optical communication network is based on at least one of a bidirectional 2-Fibre (2F) wavelength division multiplexing (WDM) ring, colorless reconfigurable optical add/drop multiplexers (ROADMs), tunable interfaces and lasers, wherein said protection tunable transceiver is connected to the optical multiplex section of the reconfigurable optical add/drop multiplexer only in the event of a failure, wherein said at least two wavelength assignment tables are derived automatically from a traffic matrix indicating logical data connections of client ports in said optical communication network, and wherein said traffic matrix is generated by a master node of said optical communication network by performing a topology discovery of the network to generate a topology table and then performing a service discovery to generate the traffic matrix.

2. The optical communication network according to claim 1, wherein each node comprises a memory which stores the at least two wavelength assignment tables, wherein each node receives the at least two wavelength assignment tables from a master node of said optical communication network via a data communication network by means of an embedded communication channel or by means of an optical supervisory channel.

3. The optical communication network according to claim 1, wherein each node comprises a control unit for controlling at least one colorless reconfigurable optical add/drop multiplexer connecting said node to said ring structure.

4. The optical communication network according to claim 3, wherein said colorless reconfigurable optical add/drop multiplexer is a directionless colorless reconfigurable optical add/drop multiplexer.

5. The optical communication network according to claim 1, wherein a transceiver unit is provided at said client port transceiver unit, said client port transceiver unit comprises a single tunable transceiver having a tunable laser generating an optical signal at a working wavelength or at a corresponding protection wavelength, both optical signals being transported in opposite directions within said ring structure of said optical communication network.

6. The optical communication network according to claim 1, wherein said client port transceiver units comprises at least one of a port of a network switch, a port of a network router, and a port of a network terminal.

7. The optical communication network according to claim 6, wherein in a normal operation mode of said optical communication network for each protection wavelength at least one colorless reconfigurable optical add/drop multiplexer is adapted to block the optical signal for the respective protection wavelength to avoid a closed loop.

8. The optical communication network according to claim 7, wherein after detection of a connection failure in a protection operation mode for all determined protection wavelengths blocking of optical signals at the respective protection wavelength is terminated.

9. The optical communication network according to claim 8, wherein said optical communication network comprises an optical channel shared protection ring.

10. The optical communication network according to claim 9, wherein said nodes are connected by spans each comprising at least two optical fibres.

11. A method for providing protection in an optical communication network against connection failures of connections between nodes, the method comprising:

at a plurality of nodes being connected to each other by means of optical fibres in a ring structure and client ports each comprising a client port transceiver unit, each client port transceiver unit comprising:

a working tunable transceiver having a tunable working laser generating an optical signal at a working wavelength transported in said ring structure in first direction, wherein said working tunable transceiver is connected to an optical multiplex section of a reconfigurable optical add/drop multiplexer, and a protection tunable transceiver having a tunable protection laser generating an optical signal at a protection wavelength transported in said ring structure in a second direction:

transporting optical signals at working wavelengths in a first direction in said ring structure, transporting optical signals at protection wavelengths in a second direction that is opposite to the first direction in said ring structure, providing for each node at least two wavelength tables in which to each working wavelength a corresponding protection wavelength is assigned, wherein a first wavelength assignment table is provided for connection failures caused by fibre breaks and a second wavelength assignment table is provided for connection failures caused by client port transceiver units, wherein in case of a detected connection failure in said ring structure each node which loses at least one connection, performing for all working wavelengths affected by said connection failure a lookup in the wavelength assignment tables to determine a respective protection wavelength, and tuning the tunable protection laser of the client port transceiver unit to the determined protection wavelengths, wherein said optical communication network is based on at least one of a bidirectional 2-Fibre (2F) wavelength division multiplexing (WDM) ring, colorless reconfigurable optical add/drop multiplexers (ROADMs), tunable interfaces and lasers, wherein said protection tunable transceiver is connected to the optical multiplex section of the reconfigurable optical add/drop multiplexer only in the event of a failure, wherein said at least two wavelength assignment tables are derived automatically from a traffic matrix indicating logical data connections of client ports in said optical communication network, and wherein said traffic matrix is generated by a master node of said optical communication network by performing a topology discovery of the network to generate a topology table and then performing a service discovery to generate the traffic matrix.

* * * * *